Nov. 2, 1948.　　　　H. HUTCHINGS　　　　2,453,069
POWER PLANT AND TRANSMISSION ARRANGEMENT
FOR AGRICULTURAL TRACTORS
Filed Dec. 9, 1946

Inventor
Herschel Hutchings,

By J. Stanley Burch
Attorney

Patented Nov. 2, 1948

2,453,069

UNITED STATES PATENT OFFICE 2,453,069

POWER PLANT AND TRANSMISSION ARRANGEMENT FOR AGRICULTURAL TRACTORS

Herschel Hutchings, Lubbock, Tex.

Application December 9, 1946, Serial No. 714,954

1 Claim. (Cl. 180—1)

This invention relates to an improved agricultural tractor of the type shown in my U. S. Letters Patent No. 2,404,442, dated July 23, 1946, wherein provision is made to enable the driver to view the ground between the sides and between the rear axle assembly and the power plant of the tractor.

According to the present invention, the propeller shaft assembly and the transmission assembly are directly connected and are offset to one side of the longitudinal center line of the tractor and laterally of the power plant and the differential assembly of the tractor, a gearing being provided between the drive shaft of the power plant and one of the two first-named assemblies, and a second gearing being provided between the other of said two first-named assemblies and the differential assembly. The arrangement permits mounting of the propeller shaft and transmission assemblies on a side frame rail of the tractor and location of the power plant and the differential assembly at or near the longitudinal center line so that a minimum of extra weight is had at the side of the tractor where the two first-named assemblies are arranged.

The exact nature of the present invention will become apparent from the following description when considered in connection with the accompanying drawing, in which—

Figure 1:
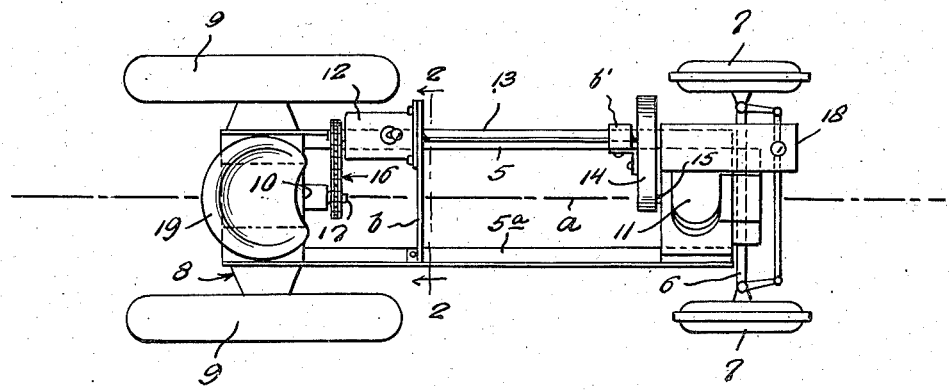
Figure 1 is a top plan view of a tractor embodying the present invention.
Figure 2:
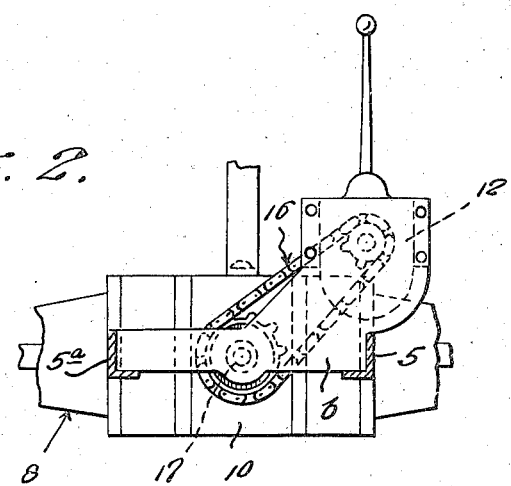
Figure 2 is an enlarged transverse section taken on line 2—2 of Figure 1.

Referring in detail to the drawing, the illustrated form of the invention includes side frame rails 5 and 5a, supported at their forward ends on a front axle 6 having front steering and supporting wheels 7, and supported at their rear ends upon a rear axle structure 8 which includes spaced rear drive wheels 9 and a differential assembly 10 located at or near the longitudinal center a of the tractor. A power plant 11 is supported by the forward end portions of the rails 5 and 5a centrally between the wheels 7.

The tractor also includes a transmission assembly 12 and a propeller shaft assembly 13 which are directly connected and supported by brackets b and b' above the rail 5, the bracket b being in the form of a transversely disposed plate secured on the rails 5 and 5a and to the housing of assembly 12, and the bracket b' being in the form of a standard secured on the rail 5.

A gearing assembly 14, like that indicated by the same reference numeral in my above named patent, is shown as operatively connecting the drive shaft 15 of power plant 11 with the shaft of assembly 13. A sprocket or other suitable gearing 16 operatively connects the drive shaft of assembly 12 with the pinion drive shaft 17 of assembly 10. However, the assembly 12 may be interposed between the assemblies 13 and 14 or between sections of the assembly 13, if desired.

The fuel storage tank is shown at 18, and a driver's seat 19 is supported on the assembly 10 between the wheels 9.

It will be apparent that the driver occupying the seat 19 may clearly view the row along the center line a between the rails 5 and 5a substantially from the structure 8 to the power plant 11.

What I claim is:

An agricultural tractor including an open frame having side rails and provided with front steering and supporting wheels, a power plant supported by the forward end of the frame centrally between said wheels and having a drive shaft located substantially at the longitudinal center of the tractor, a rear axle structure supporting the rear end of the frame and including rear drive wheels and a differential assembly having a drive shaft located substantially at the longitudinal center of the tractor, a propeller shaft assembly and a transmission assembly directly connected together and supported by and above one of said side rails to one side of said center, a gearing connecting the propeller shaft assembly with the drive shaft of said power plant, a second gearing connecting the transmission assembly with the differential assembly, a transverse supporting bracket secured on said side rails and having an upward extension at one end disposed above said one side rail and fixed to the front of said transmission assembly, and a driver's seat supported on the differential assembly between the drive wheels.

HERSCHEL HUTCHINGS.

REFERENCES CITED

The following references are of record in the file of this patent:

UNITED STATES PATENTS

| Number | Name | Date |
|---|---|---|
| 913,250 | Bailey | Feb. 23, 1909 |
| 1,546,708 | Booth | July 21, 1925 |
| 2,046,429 | Ronning | July 7, 1936 |
| 2,232,154 | Wagner | Feb. 18, 1941 |
| 2,261,354 | Fee | Nov. 4, 1941 |
| 2,404,442 | Hutchings | July 23, 1946 |